US008570345B2

(12) United States Patent  (10) Patent No.: US 8,570,345 B2
Fujimoto et al.  (45) Date of Patent: Oct. 29, 2013

(54) IMAGE DISPLAY DEVICE (75) Inventors: Makoto Fujimoto, Kyoto (JP); Genji Kohara, Kobe (JP)

(73) Assignee: Kyocera Corporation, Kyoto (JP)

( * ) Notice: Subject to any disclaimer, the term of this patent is extended or adjusted under 35 U.S.C. 154(b) by 534 days.

(21) Appl. No.: 12/921,770

(22) PCT Filed: Mar. 11, 2009

(86) PCT No.: PCT/JP2009/054689
§ 371 (c)(1),
(2), (4) Date: Sep. 9, 2010

(87) PCT Pub. No.: WO2009/113587
PCT Pub. Date: Sep. 17, 2009

(65) Prior Publication Data
US 2011/0007095 A1    Jan. 13, 2011

(30) Foreign Application Priority Data
Mar. 13, 2008   (JP) .................................. 2008-064761

(51) Int. Cl.
*G09G 5/00*   (2006.01)
(52) U.S. Cl.
USPC ........................................................ 345/650
(58) Field of Classification Search
USPC ........................................................ 345/650
See application file for complete search history.

(56) References Cited

U.S. PATENT DOCUMENTS

2010/0156939 A1*   6/2010  Lee ............................... 345/650

FOREIGN PATENT DOCUMENTS

| JP | 07-168529 | 7/1995 |
|---|---|---|
| JP | 10-301695 | 11/1998 |
| JP | 2001-159951 | 6/2001 |
| JP | 2001-350588 A | 12/2001 |
| JP | 2005-012493 | 1/2005 |
| JP | 2007-164614 A | 6/2007 |

OTHER PUBLICATIONS

International Search Report issued in PCT/JP2009/054689, on Apr. 28, 2009, 10 pages.
Notice of Grounds for Rejection dated Mar. 14, 2012, issued in counterpart Korean Application No. 10-2010-7022798.
Written Opinion of the International Searching Authority dated Apr. 28, 2009 for International Application No. PCT/JP2009/054689.
Notification of Reasons of Refusal dated Aug. 28, 2012, issued in counterpart Japanese Application No. 2008-064761.
Decision of Rejection dated Oct. 22, 2012, issued in counterpart Korean Application No. 10-2010-7022798.

* cited by examiner

*Primary Examiner* — Ryan R Yang
(74) *Attorney, Agent, or Firm* — Procopio, Cory, Hargreaves & Savitch LLP (57) ABSTRACT

[Object]
It is an object of the present invention to provide an image display device capable of properly setting a display direction of an image in accordance with a user's will.
[Constitution]
When a user holds a cell phone such that a first switching key 8 comes closer to the user's body, this makes the user push the first switching key 8. If the user pushes the first switching key 8, a CPU 100 displays a display image such that a display direction becomes a first direction where the first switching key 8 comes downside. If the user holds the cell phone such that a second switching key 9 comes closer to the user's body, this makes the user push the second switching key 9. If the user pushes the second switching key 9, the CPU 100 displays the display image such that the display direction becomes a second direction where the second switching key 9 comes downside.

7 Claims, 8 Drawing Sheets

IMAGE DISPLAY DEVICE

TECHNICAL FIELD

The present invention relates to an image display device, and more particularly, the invention is suitably used for a portable terminal device such as a cell phone and a Personal Digital Assistant (PDA).

BACKGROUND ART

In a conventional cell phone, a display area for displaying an image thereon and an operating portion for carrying out operation/inputting operation are individually disposed. In the case of a folding cell phone and a sliding cell phone, the display area and the operating portion are superposed on each other when the cell phone is not used, and when the cell phone is used, the display area is turned or slid so that the display area and the operating portion are vertically lined up. The display area and the operating portion are disposed in this manner because the inputting operation by the operating portion can be easily carried out while seeing the display area.

In such a cell phone, when the cell phone is turned around from a vertical orientation to a horizontal orientation while a television picture is displayed on the display area, a display condition of the television picture can be correspondingly changed from a vertical display to a horizontal display. In this case, in addition, as the cell phone is turned around the horizontal orientation, a display condition of characters and symbols added to operation keys of the operating portion can also be changed the horizontal display.

DISCLOSURE OF THE INVENTION

Problem to be Solved by the Invention

In the case of the above configuration, a display direction of an image is automatically set, in accordance with the orientation of the cell phone, but the display direction of the image can not be set freely in accordance with a user's will. However, when a user tries to temporarily show an image to the other person who is opposed to the user for example, it is convenient if the display direction of the image can be properly switched to a desired direction in a state where the user holds the cell phone in his or her hand.

It is possible to use an entire front surface of the cell phone as a display region, and to allocate an image of content information and an image of an operation button to the display region. In this case, a touch panel is disposed on the display region, and an inputting operation can be carried out through the image for the operation button. According to this configuration, however, in a state where no image is displayed on the display region when the cell phone is not used, the user can not immediately know, from its exterior appearance, which direction the display direction of the cell phone is. Therefore, in the case of this configuration, it is preferable that the cell phone starts the display of the screen in a direction in which the user hold the cell phone (viewing direction) by the user's will. According to the latter configuration, the user does not always need to pay attention to the orientation of the cell phone, and can appropriately display an image in a direction in which the user hold the cell phone (viewing direction) only by starting the display of the screen by a predetermined operation.

The present invention has been accomplished in view of such a problem and it is an object of the invention to provide an image display device capable of properly setting a display direction of an image in accordance with a user's will.

Means to Solve the Problem

An image display device according to a first aspect of the present invention comprises a display area having a display region on which an image is displayed, a display controller which controls a display of the image, an operating portion for setting display directions of the image, and a position detector which detects a position on the display region designated by a user. The display controller lines up an image for providing information and an image for carrying out operation/inputting operation on the display region in one of the display directions corresponding to an operation to the operating portion such that a positional relation of the images is maintained in the respective display directions. The position detector is disposed such that a detection region of the position detector covers a region where the image for carrying out the operation/inputting operation is located in the respective display directions which can be set through the operating portion.

According to the image display device of the first aspect, if a user operates the operating portion, the display direction of the image for providing the information and the image for carrying out the operation/inputting operation can be set to a desired direction. Therefore, the user can freely set the display direction as necessary. Additionally, since the positional relation of a content image and the image for carrying out the operation/inputting operation is the same when viewed in the respective display directions, the user can see the images without a sense of incongruity, or can show the images to the other person without giving a sense of incongruity.

In addition, according to the first aspect, since the disposition of the content image and the image for carrying out the operation/inputting operation is not changed in any display directions, the user or the other person can smoothly carry out the operation or the inputting operation while seeing the content image. At that time, since the disposition region of the image for carrying out the operation/inputting operation in each of the display directions is covered with the detection region of the position detector, the user can properly carry out the inputting operation using the image for carrying out the operation/inputting operation in any display directions.

An image display device according to a second aspect of the invention comprises a display area having a display region on which an image is displayed, a display controller which controls a display of the image, and an operating portion for setting display directions of the image. The display controller lines up an image for providing information and an image for carrying out operation/inputting operation on the display region in one of the display directions corresponding to operation to the operating portion such that a positional relation of the images is maintained in the respective display directions.

According to the image display device of second aspect, a user can freely set the display direction as necessary like in the first aspect. When the user sees an image in the respective display directions, the user can see the image without a sense of incongruity, or can show an image to someone else without giving a sense of incongruity.

In the first and second aspects, the "image for providing information" is an image for providing a user with predetermined information such as a television picture, a mail image and a menu image. The "image for carrying out the operation/inputting operation" is an image for a user to perform a predetermined input operation, and an example thereof includes an image showing an operation key.

The effect and the significance of the present invention will further be apparent from the description of the following embodiments. The following embodiments are merely one example for carrying out the invention, and the invention is not limited to the described embodiments.

The drawings are only for the purpose of explaining the invention, and the drawings do not limit the scope of the invention.

BEST MODE FOR CARRYING OUT THE INVENTION

An embodiment of the present invention will be described below with reference to the drawings. In the embodiment, a surface on which an image is displayed is referred to as a display surface, and an image displayed on an entire surface of the display surface is referred to as a display image.

In the embodiment, a liquid crystal display 2 corresponds to a "display area" in claims, and a touch panel 4 corresponds to a "position detector" in claims. A first switching key 8 and a second switching key 9 correspond to a "first operating portion" and a "second operating portion" in claims, respectively. An angle sensor 14 corresponds to an "inclination detector" in claims. A "display controller" and a "viewing direction determining section" in claims are realized as functions given to a CPU 100 by executing control programs stored in a memory 101. Description of a correspondence between parts described in claims and those in the embodiment is merely one example, and claims are not limited to the embodiment.

Figure 1:
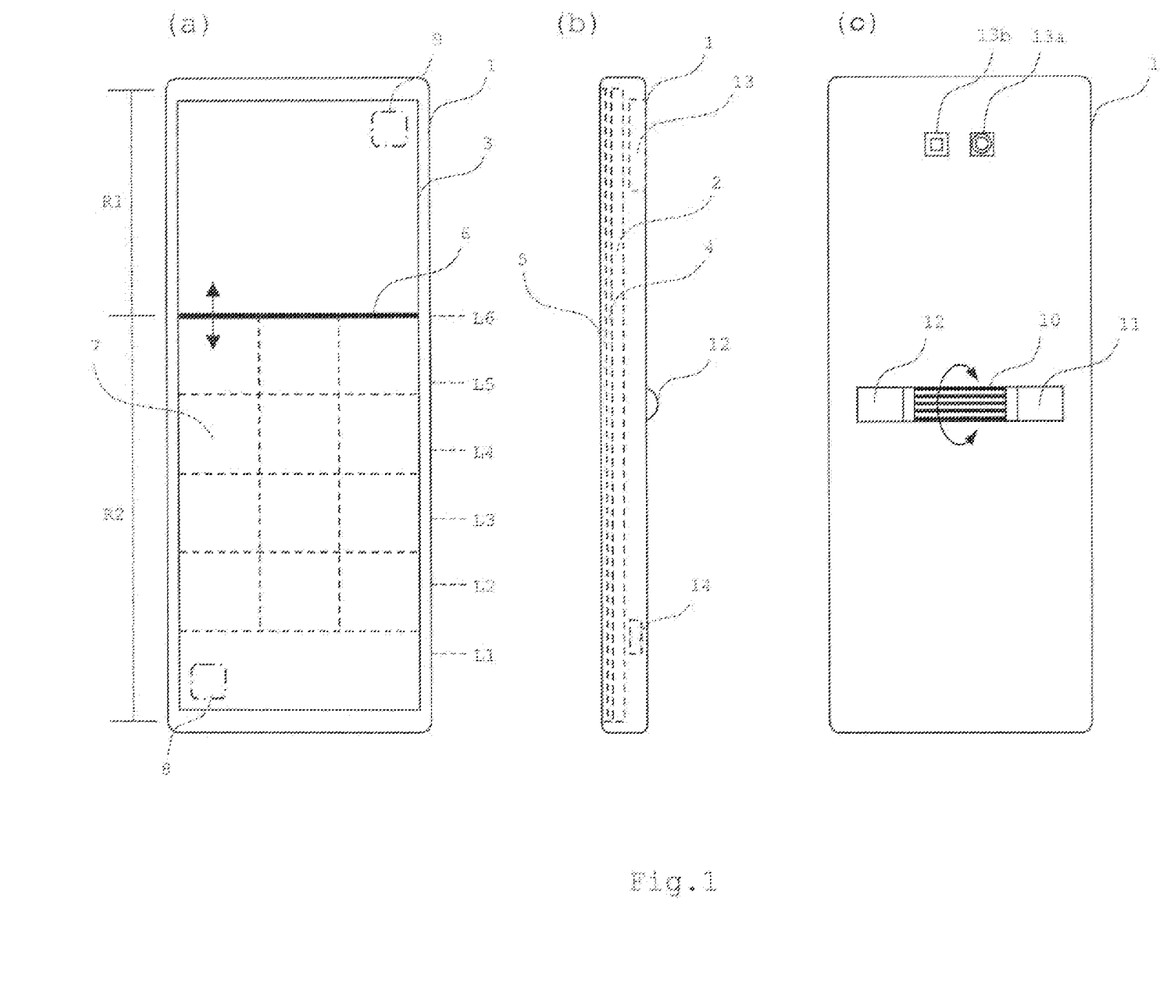
FIG. 1 are diagrams showing an exterior appearance of a cell phone according to an embodiment.

FIG. 1 are diagrams showing an exterior appearance of a cell phone which is the one embodiment of an image display device of the present invention. FIGS. 1(*a*), 1(*b*) and 1(*c*) are a front view, a right side view and a back view, respectively.

With reference to FIG. 1, the cell phone of the embodiment includes a cabinet 1 constituting an outline form of the cell phone. The cabinet 1 has a vertically long rectangular shape as viewed from front. A liquid crystal display 2 is disposed on the side of a front surface of the cabinet 1, and a display surface 3 of the liquid crystal display 2 faces outside from the front surface of the cabinet 1. The display surface 3 has a vertically long rectangular shape like the cabinet 1, and occupies substantially the entire surface of the front surface of the cabinet 1.

As shown in the drawings, the cell phone has substantially a symmetric shape vertically and laterally, and only the display surface 3 is disposed as viewed from front. That is, the cell phone has such a shape that top or bottom of the cell phone can not be immediately recognized from its exterior appearance.

A clear touch panel 4 is disposed on the front of the liquid crystal display 2. The touch panel 4 detects a position on the display surface 3 pushed by a user, and outputs a signal (position signal) corresponding to that position. A clear protection panel 5 is disposed on the front of the touch panel 4. The protection panel 5 protects the touch panel 4 so that the touch panel 4 is not damaged.

According to the cell phone, display images corresponding to various kinds of function modes (a mail mode, a television mode, a music mode, an Internet mode, a camera mode, and the like) are displayed on the display surface 3. The user can execute the processing of these function modes by carrying out predetermined operations on the display surface 3.

A bar 6 extending in the horizontal direction is included in the display image displayed on the display surface 3. The bar 6 divides the display image into upper and lower two regions. A region above the bar 6 is an information display region R1 and a region below the bar 6 is an operation region R2. Various kinds of information sets such as a television picture, a picture image and a text image are displayed on the information display region R1. Images of various operation keys 7 (soft keys) are displayed on the operation region R2. The operation keys 7 are allocated on the touch panel 4 in accordance with the function modes.

A first switching key 8 is allocated on the touch panel 4 at a left corner of a lower portion of the display surface 3. A second switching key 9 is allocated on the touch panel 4 at an opposing corner with respect to the first switching key 8 on the display surface 3, i.e., at a right corner of an upper portion of the display surface 3. When a display image of the function mode is displayed on the display surface 3, images of the first and second switching keys 8 and 9 are displayed in predetermined display styles corresponding to a display direction of the display image. When the cell phone is in a standby status, the display on the display surface 3 is turned OFF and the images of the switching keys 8 and are not displayed, but if the user pushes regions corresponding to the switching keys 8 and 9, the function thereof is accepted.

The bar 6 can be moved vertically on the display image by operating a jog dial 10. The jog dial 10 is provided at a central location on the back surface of the cabinet 1, and the jog dial 10 rotates in the vertical direction. If the jog dial 10 rotates upward, the bar 6 moves upward, and if the jog dial 10 rotates downward, the bar 6 moves downward. The bar 6 is moved vertically in accordance with an operation of the touch panel 4 by the user in some cases depending on the function modes.

An R button 11 and an L button 12 are disposed on right and left sides of the jog dial 10, respectively. An operation for carrying out certain processing can be carried out by the R button 11 and the L button 12.

A camera module 13 is disposed in an upper portion of the cabinet 1. An image pickup lens 13*a* and a flash 13*b* of the camera module 13 are disposed in the back surface of the cabinet 1.

An angle sensor 14 is disposed in the cabinet 1. The angle sensor 14 detects an inclination angle $\alpha$ of the cell phone with respect to a horizontal plane in the vertical direction (longitudinal direction).

According to the cell phone, the display images of the various kinds of function modes can be switched by fixing the bar 6 at predetermined positions. Therefore, a plurality of fixing positions (e.g., L1 to L6) is set on the display image in the vertical direction as shown in FIG. 1(a). For example, if the user operates the jog dial 10, moves the bar 6 to the fixing position L5, and pushes the R button 11 in a state the bar 6 is in the fixing position L5, a display image of the television mode is displayed. If the user moves the bar 6 to the fixing position L6 and pushes the R button 11, the display image of the television mode is switched to a display image of the mail mode.

Figure 2:
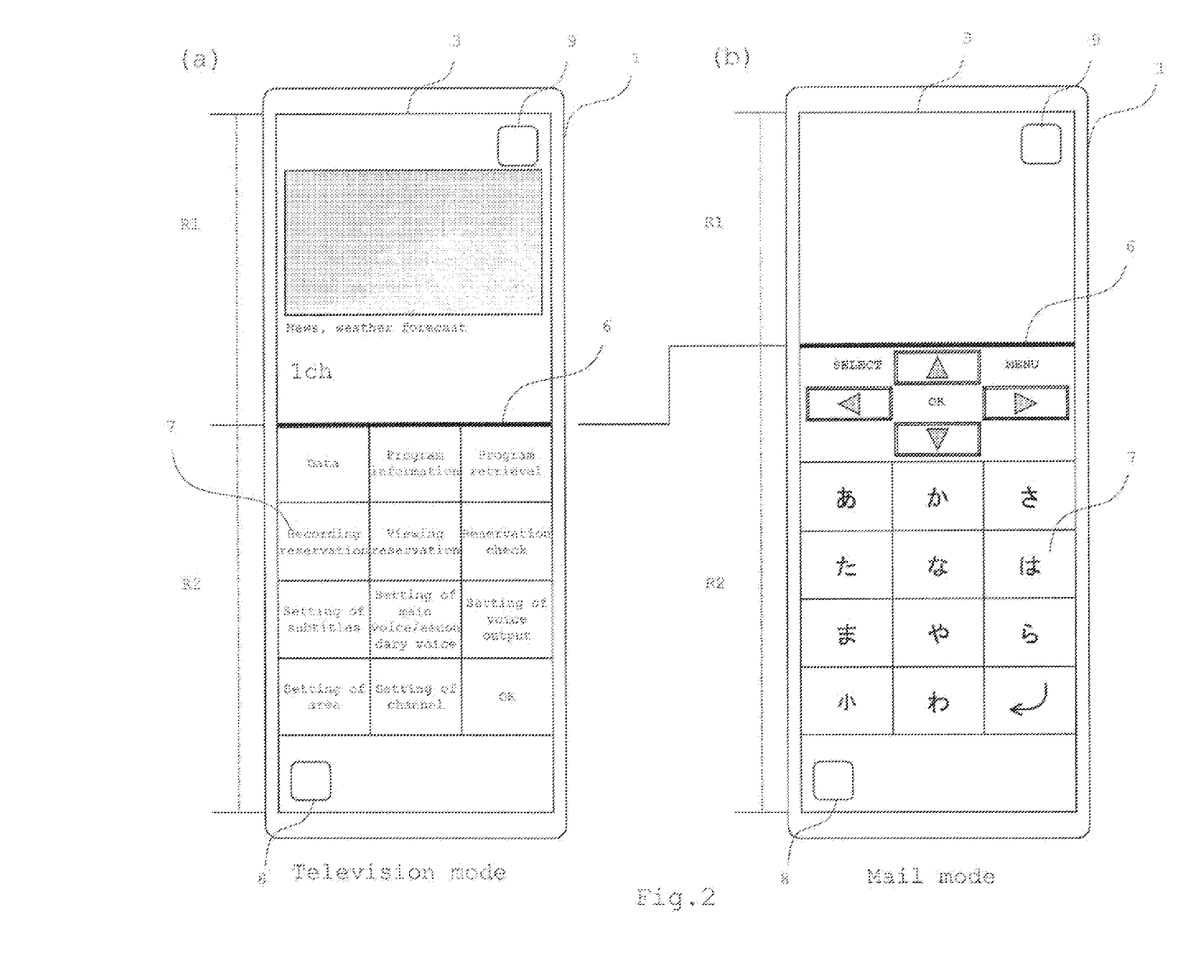
FIG. 2 are diagrams showing display images in television mode and a mail mode according to the embodiment.

FIG. 2(a) shows the display image of the television mode. FIG. 2(b) shows the display image of the mail mode. In the television mode, video contents (moving images of a television program for example) are displayed on the information display region R1 as shown in FIG. 2(a), and the plurality of operation keys 7 for operations related to video display is displayed on the operation region R2. In the mail mode, characters which are input, and the like are displayed on the information display region R1 as shown in FIG. 2(b), and the plurality of operation keys 7 for inputting, sending and receiving a mail is displayed on the operation region R2. Characters of each operation key 7 showing the functions are surrounded by rectangular lines so that boundaries between the adjacent functions can be clear.

Figure 3:
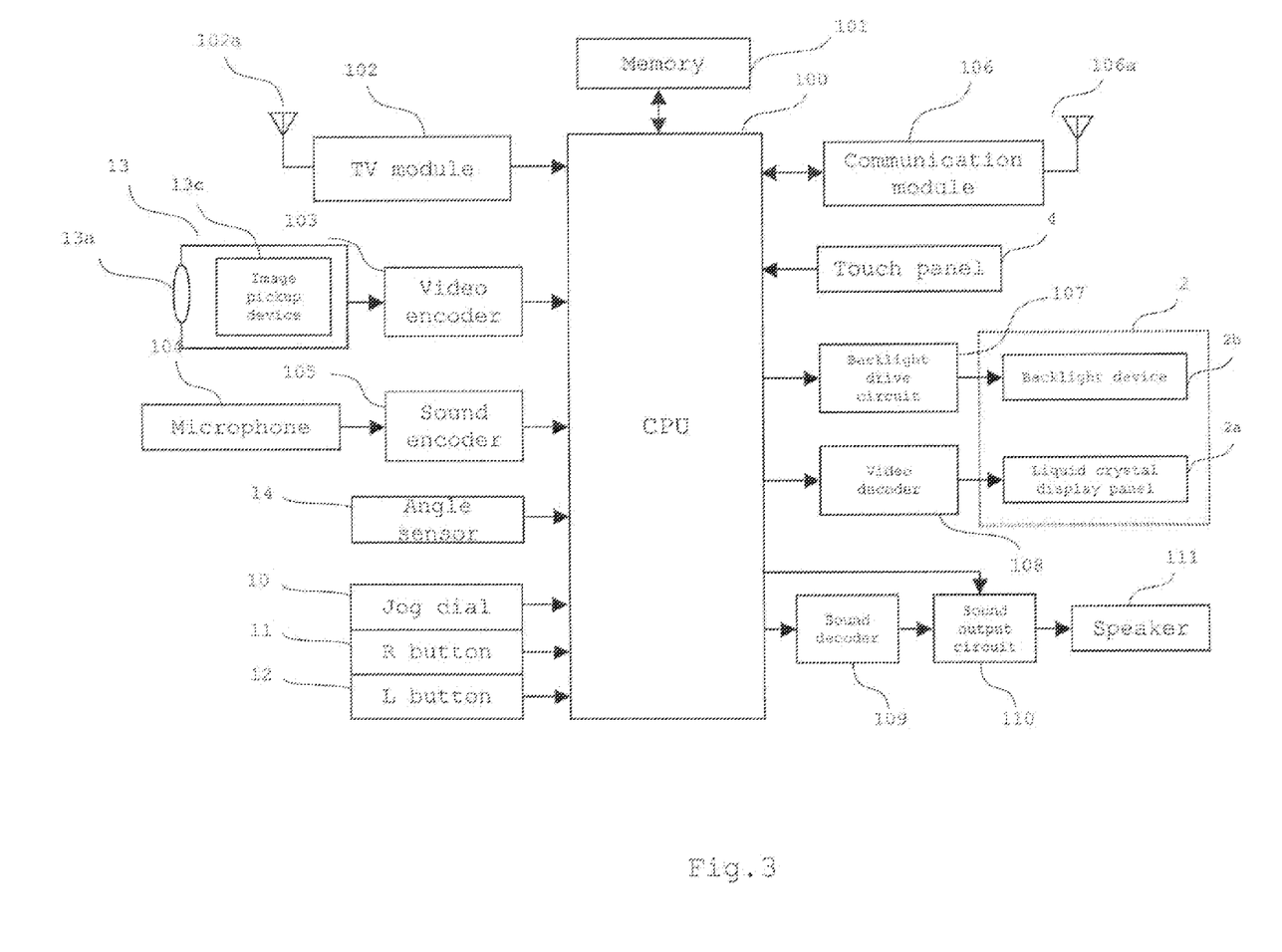
FIG. 3 is a block diagram showing an entire configuration of the cell phone according to the embodiment.

FIG. 3 is a block diagram showing an entire configuration of the cell phone according to the embodiment. In addition to the constituent parts described with reference to FIG. 1, the cell phone further includes a CPU 100, a memory 101, a TV module 102, a video encoder 103, a microphone 104, a sound encoder 105, a communication module 106, a backlight drive circuit 107, a video decoder 108, a sound decoder 109, a sound output circuit 110 and a speaker 111.

The TV module 102 includes a TV tuner, a DEMUX (Demultiplexer) and the like, converts electric wave such as digital terrestrial broadcast wave and analogue terrestrial broadcast wave received through an antenna 102a into a video signal and a sound signal, and sends the signals to the CPU 100.

The camera module 13 includes an image pickup device 13c. An image of a subject captured from the image pickup lens 13a is formed on the image pickup device 13c. The image pickup device 13c includes a CCD for example, produces an image pickup signal corresponding to a captured image, and sends the signal to the video encoder 103. The video encoder 103 converts an image pickup signal from the image pickup device 13c into a digital image pickup signal which can be processed by the CPU 100, and output the same to the CPU 100.

The microphone 104 converts a sound signal into an electric signal, and outputs the same to the sound encoder 105. The sound encoder 105 converts a sound signal from the microphone 104 into a digital sound signal which can be processed by the CPU 100, and outputs the same to the CPU 100.

The communication module 106 converts a sound signal, an image signal, a text signal and the like from the CPU 100 into radio signals, sends the same to a base station through an antenna 106a. The communication module 106 converts a radio signal received through the antenna 106a into a sound signal, an image signal, a text signal and the like, and outputs the same to the CPU 100.

The liquid crystal display 2 includes a liquid crystal display panel 2a and a backlight device 2b which becomes a light source for the liquid crystal display panel 2a. The backlight drive circuit 107 supplies a voltage signal corresponding to a control signal from the CPU 100 to the backlight device 2b. The backlight device 2b supplies light of quantity corresponding to the voltage signal to the liquid crystal display panel 2a. The video decoder 108 converts a video signal from the CPU 100 into an analogue video signal which can be displayed on the liquid crystal display panel 2a, and outputs the same to the liquid crystal display panel 2a. The liquid crystal display panel 2a displays an image corresponding to the video signal on the display surface 3.

The sound decoder 109 converts a sound signal from the CPU 100 into an analogue sound signal which can be output by the speaker 111, and outputs the same to the sound output circuit 110. A sound signal from the sound decoder 109 and a control signal sent from the CPU 100 for adjusting a sound level are input to the sound output circuit 110. In accordance with a control signal from the CPU 100, the sound output circuit 110 amplifies a sound signal which is input, and outputs the same to the speaker 111. The speaker 111 plays a sound signal from the sound output circuit 110 as sound.

Image data shot by the camera module 13, image data captured from outside through the communication module 106, text data (mail data), and the like are stored in the memory 101 in predetermined file formats.

The memory 101 includes a RAM and a ROM. The RAM functions as a work area used when the CPU 100 produces an image to be displayed on the liquid crystal display 2. A control program for operating the CPU 100 is stored in the ROM.

The CPU 100 outputs control signals to various elements such as the communication module 106, the video decoder 108 and the sound decoder 109 based on input signals from various elements such as the touch panel 4, the jog dial 10, the R button 11, the L button 12, the microphone 104 and the image pickup device 13c, thereby carrying out the processing of various kinds of function modes.

The CPU 100 makes the display surface 3 display the display images in the various function modes in a display direction corresponding to the operations of the first switching key 8 and the second switching key 9.

Figure 4:
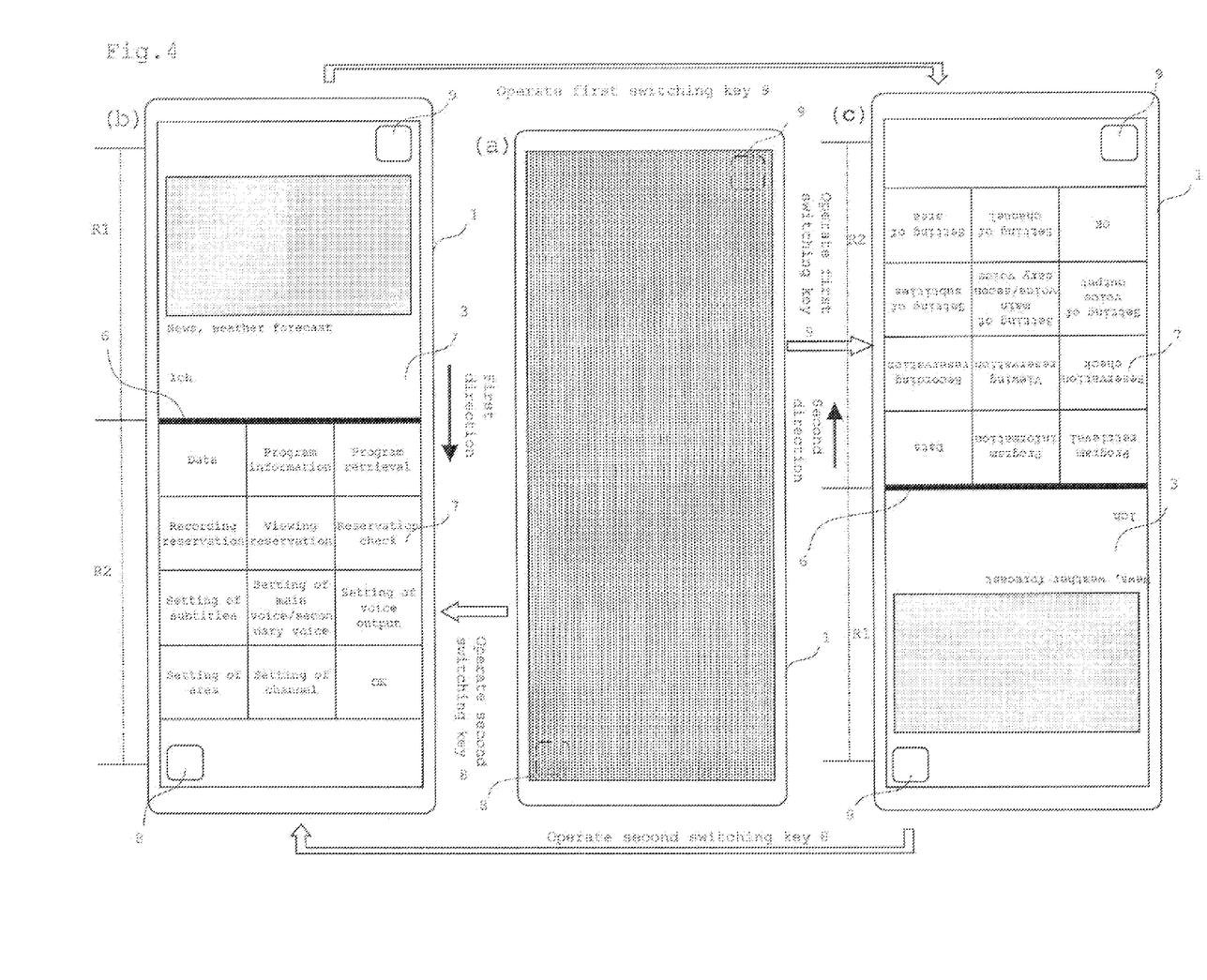
FIG. 4 are diagrams for explaining switching processing of a display direction according to the embodiment.

FIG. 4 show a switching state of the display direction of a display image corresponding to the operations of the first and second switching keys 8 and 9. The switching processing of the display direction by the CPU 100 will be described with reference to FIG. 4. FIG. 4 show a display image in the television mode, but the same processing is carried out also in display images of other function modes.

As shown in FIG. 4(a), in the standby status, the CPU 100 brings the liquid crystal display 2 into a non-drive state. This suppresses power consumption of a battery (not shown). At that time, as described above, although the image of each of the first and second switching keys 8 and 9 is not displayed, if its region is pushed, the key can be operated. That is, CPU 100 monitors whether the first and second switching keys 8 and 9 are pushed in the standby status.

In the standby status, the cell phone is usually put in a bag or a pocket. When the user takes out the cell phone from the bag or the like and tries to use the phone, since nothing is displayed on the display surface 3, the user can not easily recognize which side is up or down at a glance. Therefore, the user holds the cell phone such that either the first switching key 8 or the second switching key 9 comes closer to the user's body. When the user holds the cell phone in any of these states, a display image can be displayed in a proper direction only by operating the left lower corer of the display surface 3.

That is, when the user holds the cell phone such that the first switching key 8 comes closer to the user's body, this makes the user push the first switching key 8. If the user pushes the first switching key 8, the CPU 100 displays the display image such that the display direction becomes a first direction where the first switching key 8 comes down as shown in FIG. 4(b).

On the other hand, when the user holds the cell phone such that the second switching key 9 comes closer to the user's body, this makes the user push the second switching key 9. If the user pushes the second switching key 9, the CPU 100 displays the display image such that the display direction becomes a second direction where the second switching key 9 comes down as shown in FIG. 4(c).

According to this configuration, no matter which orientation the user holds the cell phone, the display image can be displayed in the direction where the side of the cell phone closer to the user's body is directed downward only by touching the left lower corner of the display surface 3. Therefore, the user does not need to check which side of the cell phone is up or down, or to change the holding direction of the cell phone when the display is upside down. Hence, ease of use for the user is enhanced.

Further, depending on the holding direction of the user, not only the direction of characters and images is changed, but also positions of the information display region R1 and the operation region R2 replace each other, and the operation region R2 always comes closer to the user's body. Therefore, the operability is not deteriorated.

Further, since the first switching key 8 and the second switching key 9 are provided at opposing corners, even if the cell phone is turned upside down, key positions are not changed. Therefore, regardless of whether the user holds the upper side or the lower side of the cell phone, the user can operate the switching keys with the same sense of position. If the user grasps which of the first and second switching keys 8 and 9 is at the left or right corner, the user can easily operate the switching keys 8 and 9 even if no image is displayed on the display region and the switching keys 8 and 9 are not displayed as in the standby status. Thus, the user can smoothly and easily actuate a screen without caring about the orientation of the cell phone body.

Next, when the cell phone is used in the state shown in FIG. 4(b), for example, the images of the first and second switching keys 8 and 9 are displayed together with the display image of the television mode on the display surface 3. At that time, since the second switching key 9 is displayed on the information display region R1, it is preferable that the image of the second switching key 9 does not hinder the image displayed there as much as possible. Hence, the display style of the second switching key 9 is set such that the key 9 is preferably inconspicuous. For example, the second switching key 9 is displayed such that only a frame showing the region is shown with a thin line, or the key 9 is shown with a key shape in pale color (slightly intenser than surroundings). Since the first switching key 8 is displayed on the operation region R2, the first switching key 8 does not need to be inconspicuous, and the first switching key 8 is shown with a thicker frame or in more intense color than the second switching key 9.

In this image display state, even if the user pushes the first switching key 8, the key is not received. If the user pushes the second switching key 9 on the other hand, the CPU 100 displays the display image such that the display direction becomes the second direction as shown in FIG. 4(c).

In the image display state shown in FIG. 4(c), the first switching key 8 is displayed on the information display region R1 on the contrary. Therefore, the display styles of the first switching key 8 and the second switching key 9 replace each other. In this image display state, even if the user pushes the second switching key 9, the key is not received. If the user pushes the first switching key 8, the CPU 100 displays the display image such that the display direction becomes the first direction as shown in FIG. 4(b).

According to this configuration, when the user passes the cell phone to the other person in front of the user, since the user or the person can push the first switching key 8 or the second switching key 9 and switch the display direction, it is unnecessary to change the orientation of the cell phone when passing the phone to the other person, and the user can smoothly pass the phone.

Although the embodiment of the invention is described above, the invention is not limited to this, and the embodiment of the invention can also be appropriately and variously modified within a range of a technical idea shown in claims. For example, the embodiment of the invention can be modified as follows:

First Modification

In the above embodiment, the cell phone is used, and if a user erroneously pushes the first switching key 8 or the second switching key 9 in a state where a display image is displayed as shown in FIGS. 4(b) and (c), the display direction is switched.

Figure 5:
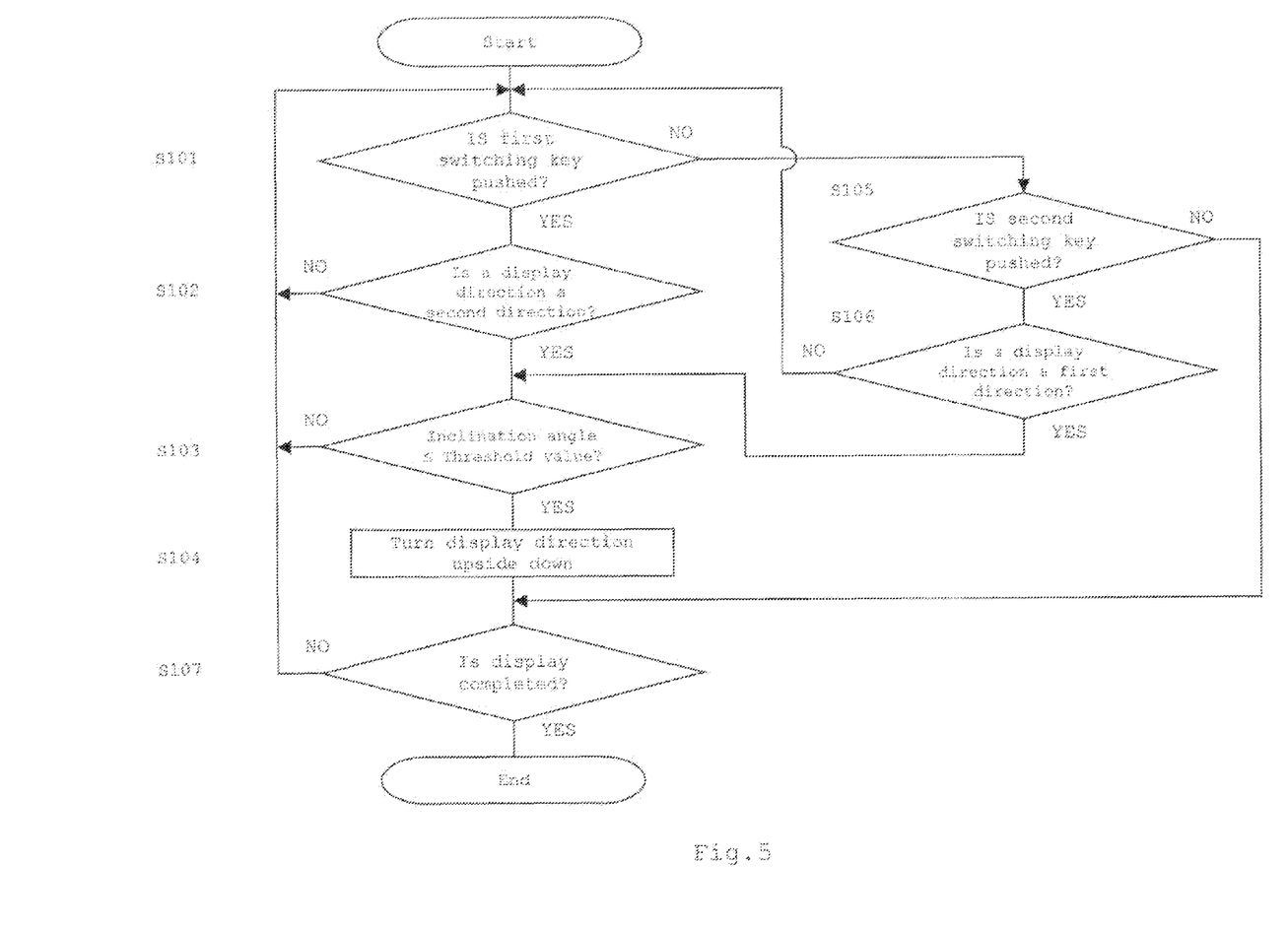
FIG. 5 is a flowchart of the switching processing of the display direction according to a first modification.
Figure 6:
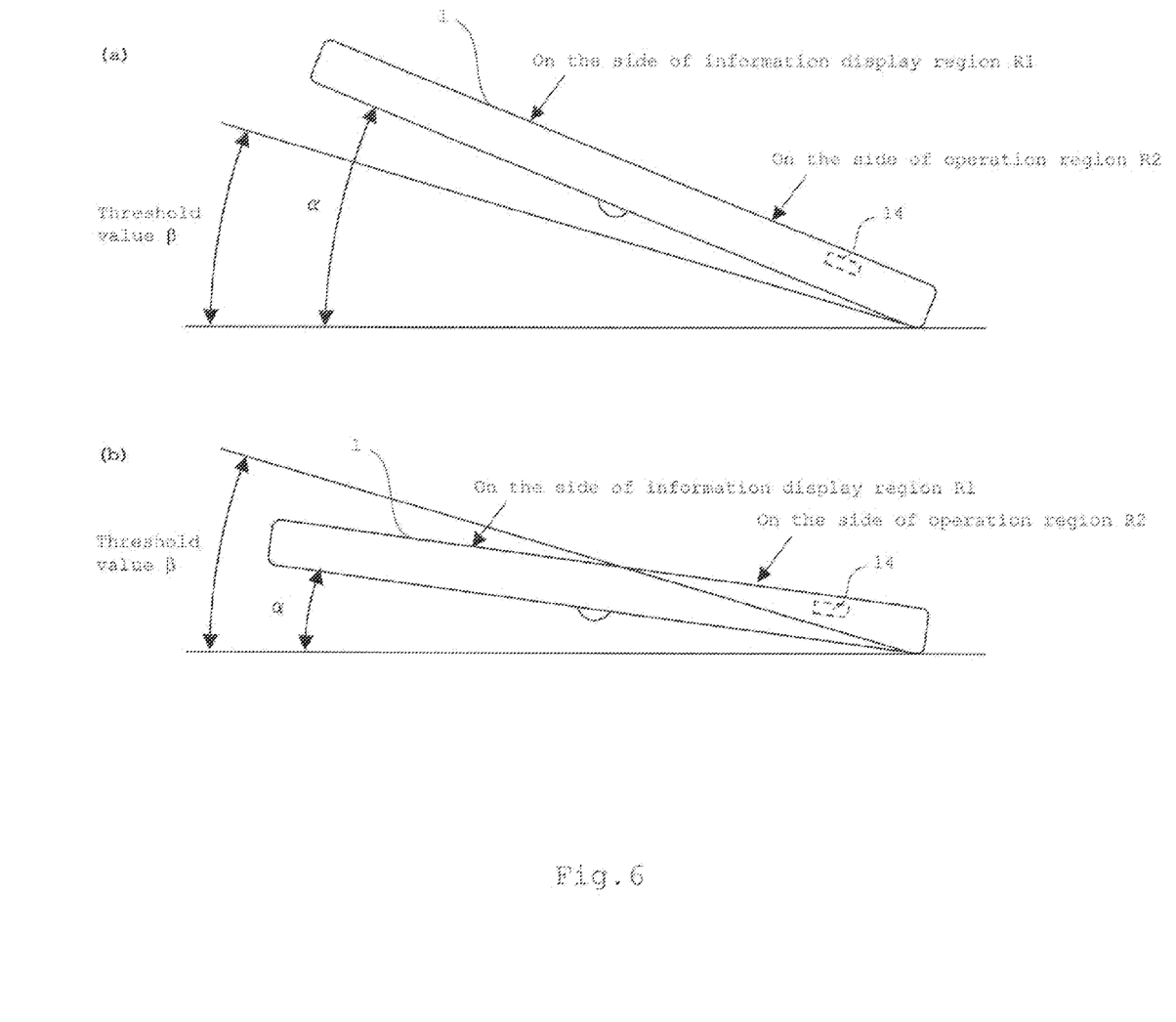
FIG. 6 are diagrams showing a relation between an inclination angle $\alpha$ and a threshold value $\beta$ of the cell phone according to the first modification.

Hence, a configuration in the first modification has a protecting function against the erroneous operation. An angle sensor 14 shown in FIG. 3 is used for the protecting function. The switching processing of the display direction having the protecting function will be described with reference to FIGS. 5 and 6. FIG. 5 is a flowchart of the switching processing of the display direction. FIG. 6 are diagrams showing a relation between an inclination angle α and a threshold value β of the cell phone.

If the CPU 100 determines that the first switching key 8 is pushed (YES in S101), the CPU 100 determines whether the display direction is the second direction (S102). If the CPU 100 determines that the display direction is the second direction (YES in S102), the CPU 100 determines whether the inclination angle α is equal to or smaller than a threshold value β (predetermined angle) (S103).

As shown in FIG. 6, the inclination angle α is an upward angle from a horizontal plane on the side of the information display region R1 with respect to the operation region R2 of the cell phone. When the user uses the cell phone, it is considered that the inclination angle α becomes large and exceeds the threshold value β as shown in FIG. 6(a) so that the user can easily see the display image. On the other hand, when the user tries to pass the cell phone to the other person, it is considered that since the orientation of the cell phone becomes close to the horizontal position, the inclination angle α becomes small, and becomes equal to or smaller than the threshold value β as shown in FIG. 6(b).

Hence, if the CPU 100 determines that the inclination angle α is equal to or smaller than the threshold value β (YES in S103), the CPU 100 determines that the key is properly pushed, and turns the display direction of the display image upside down in the first direction (S104). On the other hand, if the CPU 100 determines that the inclination angle α exceeds the threshold value β (NO in S103), the CPU 100 determines that the key is erroneously pushed, and cancels the key (the display direction is not turned upside down).

Also when the second switching key 9 is pushed (YES in S105), if the CPU 100 determines that the display direction is the first direction (YES in S106), the CPU 100 compares the inclination angle α with the threshold value β (S103), and only when the CPU 100 determines that the inclination angle α is equal to or smaller than the threshold value β, the CPU 100 turns the display direction of the display image to the second direction (S104).

The cell phone is brought into the standby status, and this processing is carried out until the display is turned OFF (YES in S107).

According to the configuration of the first modification, even if the first and second switching keys 8 and 9 are erroneously pushed, it is possible to prevent the display from being switched.

Second Modification

In the embodiment, the first and second switching keys 8 and 9 are displayed on the display surface 3 and only the switching key on the side of the information display region R1 can be received in the image display state shown in FIGS. 4(b) and 4(c). However, the invention is not limited to this configuration, and in a state where the display image is displayed in either one of the directions, when either one of the first and second switching keys 8 and 9 is pushed, the display direction may be switched in a direction opposite from the display direction at that time.

According to this configuration, when a user passes the cell phone to the other person, it is only necessary to push the switching key on the side of the user's body (first switching key 8 in the case of FIG. 4(b)), and ease of use is further enhanced.

When this configuration is employed, since the switching key on the side of the operation region R2 can be operated, the possibility of the erroneous operation is increased as compared with the above embodiment. Therefore, when this configuration is employed, it is preferable to add the protecting function of the first modification. It is also possible to employ such a configuration that the switching key on the side of the operation region R2 is not received until the key is operated in a special manner, e.g., until the key is held down for a long time or pushed a plurality of times.

When priority is given to that the display of the information display region R1 is not hindered, display of the switching keys on the side of the information display region R1 is turned OFF, and the display direction is switched only by the switching key on the side of the operation region R2.

Third Modification

Figure 7:
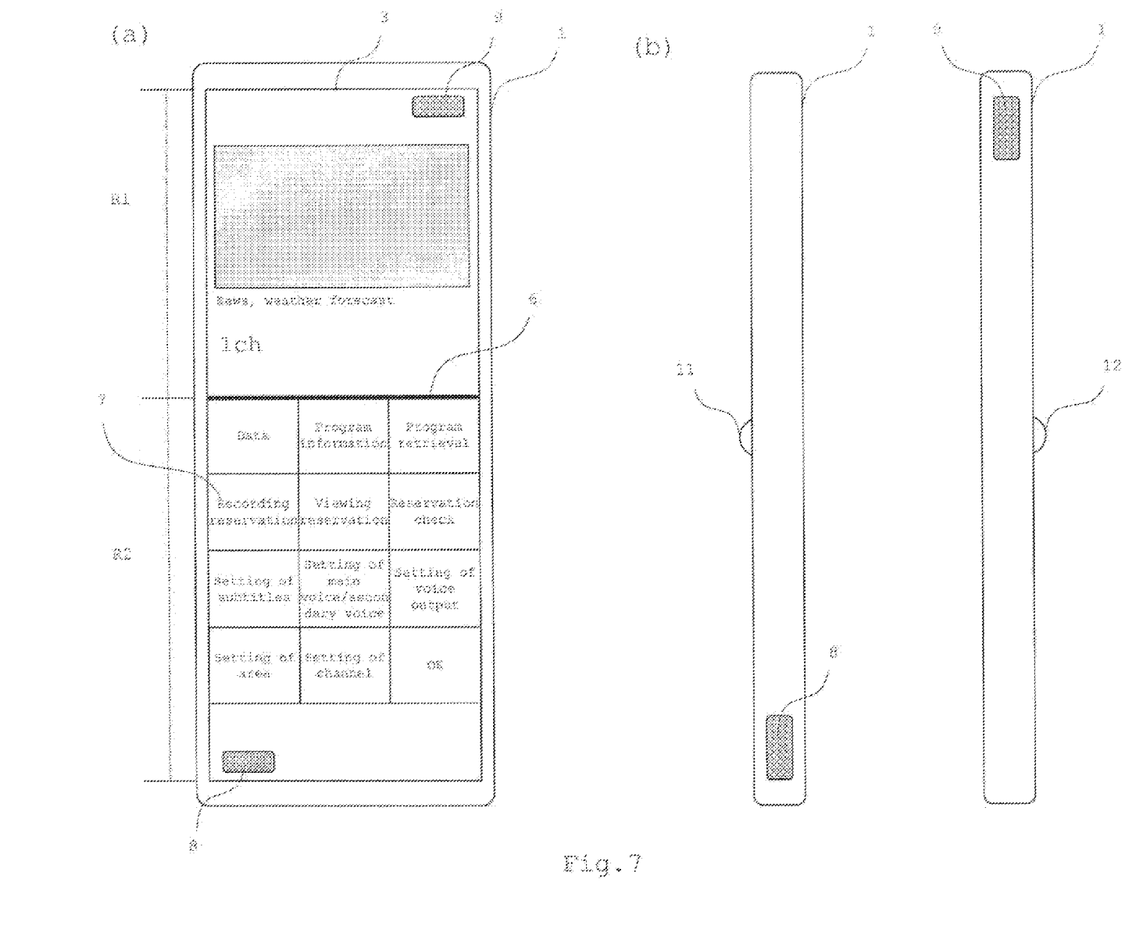
FIG. 7 are diagrams showing a disposition configuration of first and second switching keys of a third modification.

In the above embodiment, the first and second switching keys 8 and 9 are disposed in the display surface 3, i.e., on the touch panel 4. However, the invention is not limited to this configuration, and the first and second switching keys 8 and 9 may be provided outside of the display surface 3, i.e., at opposing corners on the lower and upper portions of the cabinet 1, respectively as shown in FIG. 7(a). Further, the first switching key 8 may be disposed on a lower portion of the left side surface of the cabinet 1, and the second switching key 9 may be dispose on an upper portion of the right side surface of the cabinet 1.

According to this configuration, even when the display of the display surface 3 is OFF in the standby status, the user can reliably recognize the first and second switching keys 8 and 9.

Another Embodiment of the Invention

Figure 8:
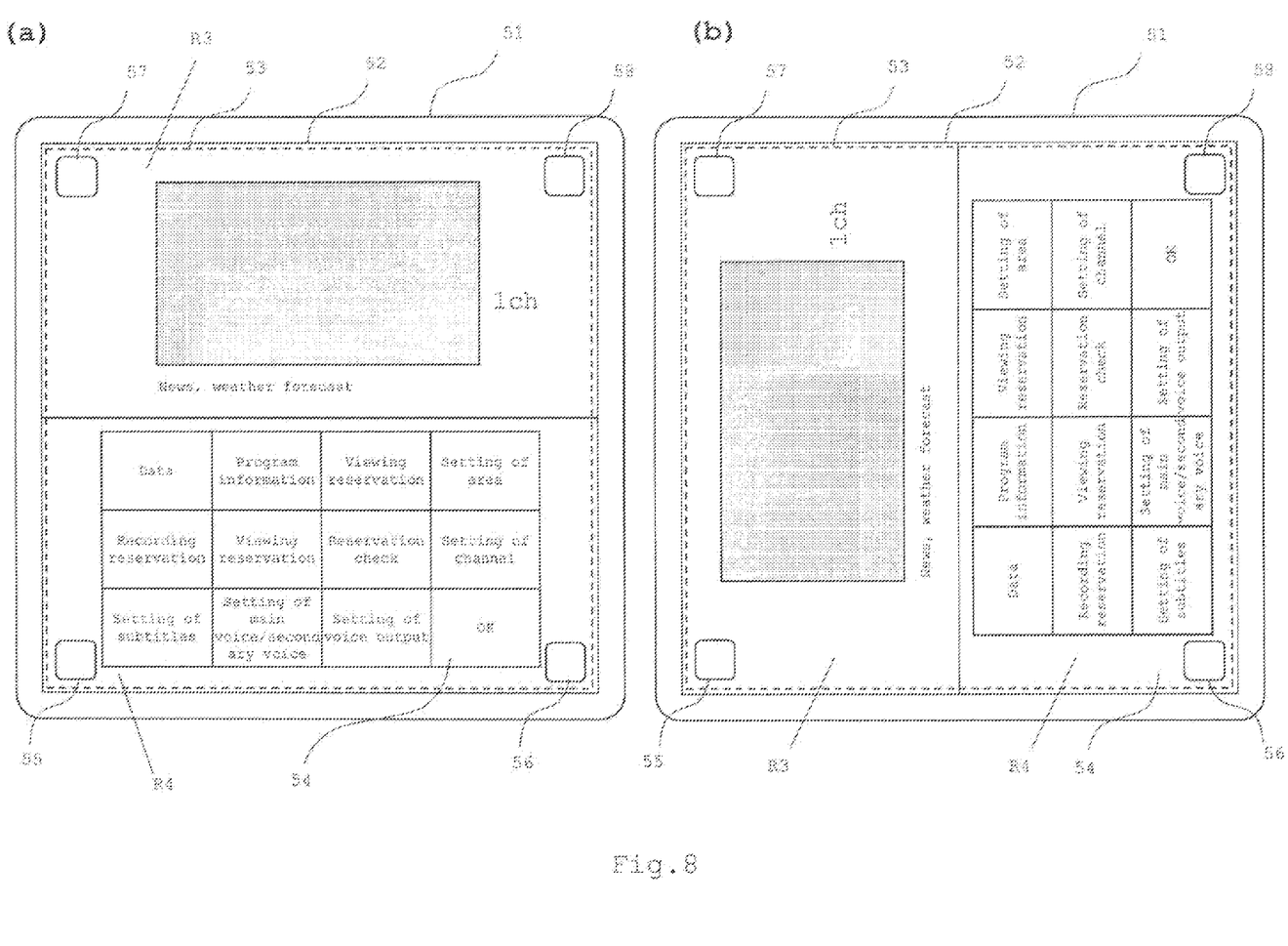
FIG. 8 are diagrams showing a configuration of a PDA according to another embodiment.

The present invention can also be applied to a FDA (Personal Digital Assistant), for example, in addition to the cell phone. FIG. 8 show a configuration of a FDA of the other embodiment.

A cabinet 51 of the PDA has substantially a square shape as viewed from front. A display surface 52 of a liquid crystal display panel (not shown) is disposed on a front surface of the cabinet 51 over its substantially entire surface. A touch panel 53 is disposed on a front surface of the display surface 52, and a protection panel (not shown) is disposed on a front surface of the touch panel 53.

Display images of various kinds of function modes (such as a television mode) displayed on the display surface 52 are divided into an information display region R3 and an operation region R4. Various kinds of information sets such as video contents (a television program, for example) are displayed on the information display region R3, and various kinds of operation keys 54 are displayed on the operation region R4.

A first switching key 55, a second switching key 56, a third switching key 57 and a fourth switching key 58 are allocated on the touch panel 53 at four corners in the display surface 52. These switching keys 55 to 58 are displayed in predetermined display styles on the display surface 52 together with the display images of the function modes like the previous embodiment.

In the PDA, if the second switching key 56 and the fourth switching key 58 on the side of a right side surface are pushed at the same time in an image display state shown in FIG. 8(a) for example, the display direction is switched to a right direction in the drawing as shown in FIG. 8(b). Similarly, if the two switching keys 55 and 57 on the side of a left side surface are pushed at the same time, the display direction is switched to a left direction in the drawing, and if the two switching keys 57 and 58 on the upper side are pushed at the same time, the display direction is switched to the upper direction in the drawing.

According to the configuration of this embodiment also, a user does not need to change the orientation of the PDA in accordance with a direction of the other person like the previous embodiment, and ease of use of the user is enhanced.

Others

In the embodiments and the modifications, when the switching keys are displayed on the display surface 3 (52), grooves showing outside shapes of the switching keys may be formed on the protection panel 5. According to this configuration, even when the switching keys are not displayed on the display surface 3, a user can easily recognize the positions of the switching keys.

It is preferable that the switching keys are displayed on both sides of the device, but the positions and the number thereof are not limited to those of the embodiments and the modifications, the positions thereof may be changed and the number thereof may be increased or decreased appropriately as needed.

The inclination angle α of the first modification may be detected by an acceleration sensor.

Although the touch panel 4 is used in the embodiments as the position detector of the invention, other sensors may be used only if the position detector can detect a position on the display region designated by a user.

The embodiments of the present invention can be appropriately and variously modified within a range of a technical idea shown in claims.

What is claimed is:

1. An image display device comprising
a display area having a display region on which an image is displayed,
a display controller which controls a display of the image,
an operating portion for setting display directions of the image, the operating portion comprising first and second operating portions disposed on both sides of a central portion of the display region, and a position detector which detects a position on the display region designated by a user, wherein the display controller lines up an image for providing information and an image for carrying out operation/inputting operation on the display region in one of the display directions corresponding to an operation to the operating portion such that a positional relation of the images is maintained in the respective display directions, and a display direction of the image for providing the information and the image for carrying out the operation/inputting operation is determined based on which of the first and second operating portions is operated, and the position detector is disposed such that a detection region of the position detector covers a region where the image for carrying out the operation/inputting operation is located in the respective display directions which can be set through the operating portion.

2. The image display device according to claim 1, wherein when the first operating portion is operated, the display controller displays the image for providing the information and the image for carrying out the operation/inputting operation in a direction where the first operating portion comes downside, and when the second operating portion is operated, the display controller displays the image for providing the information and the image for carrying out the operation/inputting operation in a direction where the second operating portion comes downside.

3. The image display device according to claim 1, wherein the first and second operating portions are disposed on the display region.

4. The image display device according to claim 3, wherein the first and second operating portions are disposed at locations of opposing corners on the display region.

5. The image display device according to claim 1, further comprising a viewing direction determining section which determines the user's viewing direction of the image for providing the information and the image for carrying out the operation/inputting operation, wherein when an operation for setting the display direction to a direction different from the viewing direction is carried out through the operating portion, the display controller cancels this operation.

6. The image display device according to claim 5, wherein the viewing direction determining section includes an inclination detector which detects an inclination of the image display device from a horizontal plane, the viewing direction determining section compares the inclination detected by the inclination detector with a threshold value, and determines the viewing direction.

7. An image display device comprising a display area having a display region on which an image is displayed, a display controller which controls a display of the image, and an operating portion for setting display directions of the image, the operating portion comprising first and second operating portions disposed on both sides of a central portion of the display region, wherein the display controller lines up an image for providing information and an image for carrying out operation/inputting operation on the display region in one of the display directions corresponding to operation to the operating portion such that a positional relation of the images is maintained in the respective display direction, and a display direction of the image for providing the information and the image for carrying out the operation/inputting operation is determined based on which of the first and second operating portions is operated.

* * * * *